United States Patent [19]
Willet

[11] Patent Number: 6,000,932
[45] Date of Patent: Dec. 14, 1999

[54] LIGHTER THAT IS CONVERTIBLE TO A FISHING LURE

[76] Inventor: David Willet, 78 Elizabeth St., Auburn, N.Y. 13021

[21] Appl. No.: 09/290,084

[22] Filed: Apr. 12, 1999

[51] Int. Cl.[6] .............................. F23Q 2/32; F23D 11/44; A01M 27/00; A01K 91/04
[52] U.S. Cl. ......................... 431/125; 431/253; 431/254; 431/256; 431/356; 43/1; 43/44.83; 43/42.45; 43/42.53
[58] Field of Search ..................................... 431/126, 253, 431/125, 132, 256, 254; 43/1, 44.83, 42.53, 42.45, 42.29

[56] References Cited

U.S. PATENT DOCUMENTS

| | | | |
|---|---|---|---|
| 2,786,295 | 3/1957 | Corning | 43/42.32 |
| 2,968,886 | 1/1961 | Cotroumpas | 43/42.06 |
| 3,488,877 | 1/1970 | Carabasse | 43/42.09 |
| 3,514,358 | 5/1970 | Monaghan et al. | 43/42.53 |
| 3,514,890 | 6/1970 | Francklyn | 43/42.05 |
| 4,022,566 | 5/1977 | Goto | 431/132 |
| 5,431,558 | 7/1995 | McDonough et al. | 431/153 |

*Primary Examiner*—Larry Jones
*Attorney, Agent, or Firm*—Brown Pinnisi & Michaels, P.C.

[57] ABSTRACT

The combination lighter and fishing lure includes a body having a feature useful for attracting a fish, a reservoir for holding a fuel, an igniter to ignite the fuel and produce a flame, an outlet at which the flame is produced, means provided on the body for attaching a fishing line, and means provided on the body for attaching a fish hook. The igniter may include a forwardly projecting valve actuator that when used as a fishing lure serves as a spoon or blade to help the lure move through the water and produce the desired lure motion. The invention provides a multipurpose device useful both as a lighter and a fishing lure and an article attractive as a novelty item.

13 Claims, 3 Drawing Sheets

LIGHTER THAT IS CONVERTIBLE TO A FISHING LURE

FIELD OF THE INVENTION

The invention pertains to the field of lighters. More particularly, the invention pertains to a lighter convertible to a fishing lure.

BACKGROUND OF THE INVENTION

Lighters such as disposable butane lighters are well known and provide a convenient and inexpensive alternative to other lighting devices such as matches. Accordingly, these lighters have become popular for everyday use and are produced in great quantity.

A problem with disposable lighters is that when the fuel is exhausted or a lighter stops working for whatever reason, the lighter is placed in the trash and destined for a landfill or incinerator, or if lost or casually discarded becomes ordinary litter. There do not appear to be any serious or concerted efforts to recycle or reuse disposable lighters in some manner, unlike other consumer products for which such provisions are made.

SUMMARY OF THE INVENTION

The invention is directed to a lighter convertible to a fishing lure. The lighter/lure includes a body having a feature useful for attracting a fish, a reservoir for holding a fuel, an igniter to ignite the fuel and produce a flame, an outlet at which the flame is produced, means provided on the body for attaching a fishing line, and means provided on the body for attaching a fish hook.

The invention is also directed to a method of converting a lighter to a fishing lure, comprising the steps of providing the lighter/lure as described above, attaching one or more fish hooks onto the body, and attaching the lighter/lure to the fishing line, thereby converting it into a fishing lure useful in attracting and catching a fish.

The invention provides an integrated lighter-fishing lure that extends the useful life of the original device, the lighter, by conversion into another useful device, the fishing lure. The invention also provides a novelty consumer item that presents the consumer a desirable option compared to conventional lighters and that may appeal to sportsmen, particularly individuals having a passion for fishing.

DESCRIPTION OF THE PREFERRED EMBODIMENT

Figure 1:
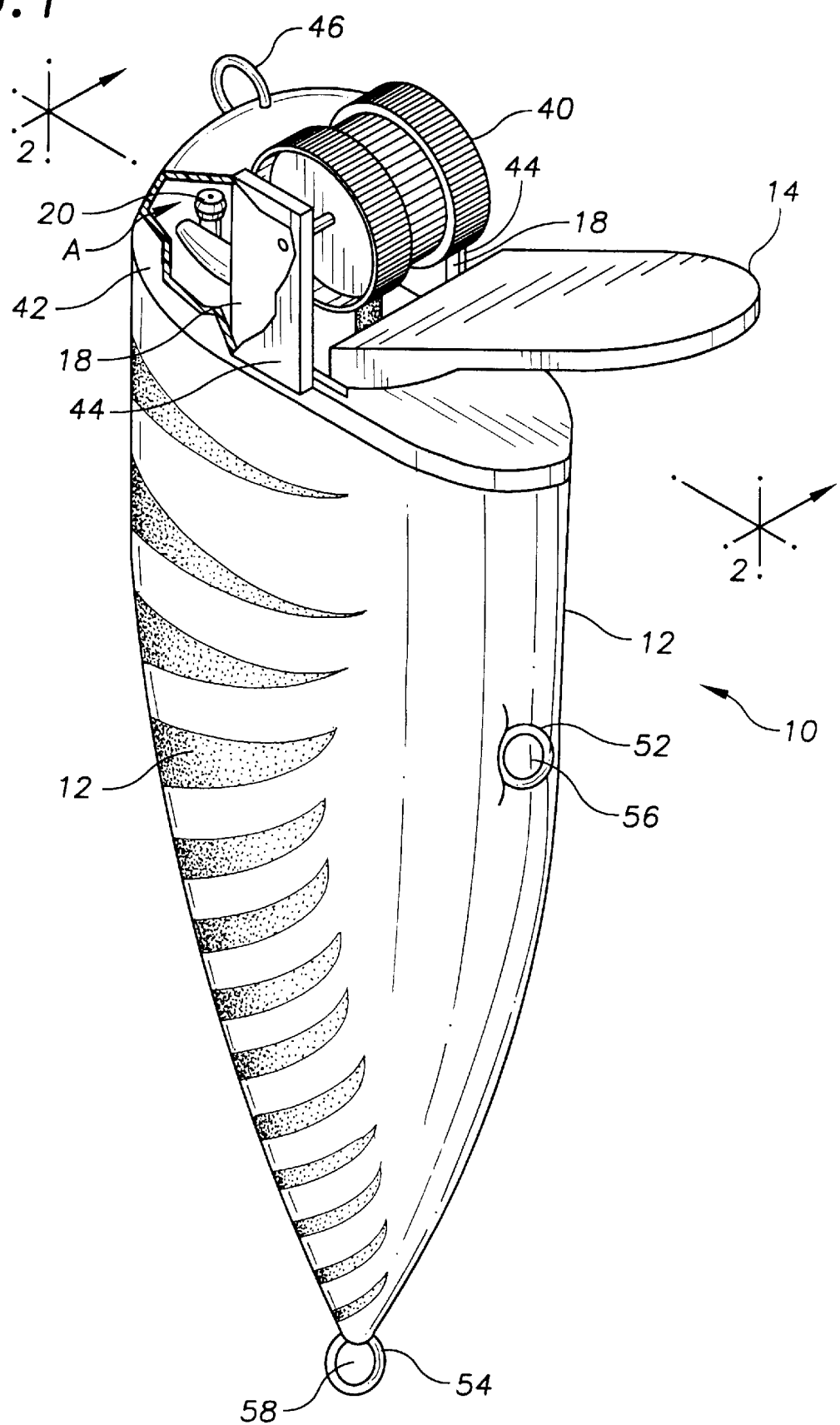
FIG. 1 shows a perspective view of a lighter/lure, with an upper sidewall portion partially cut away ("A") to expose underlying structure, as in the invention.
Figure 2:
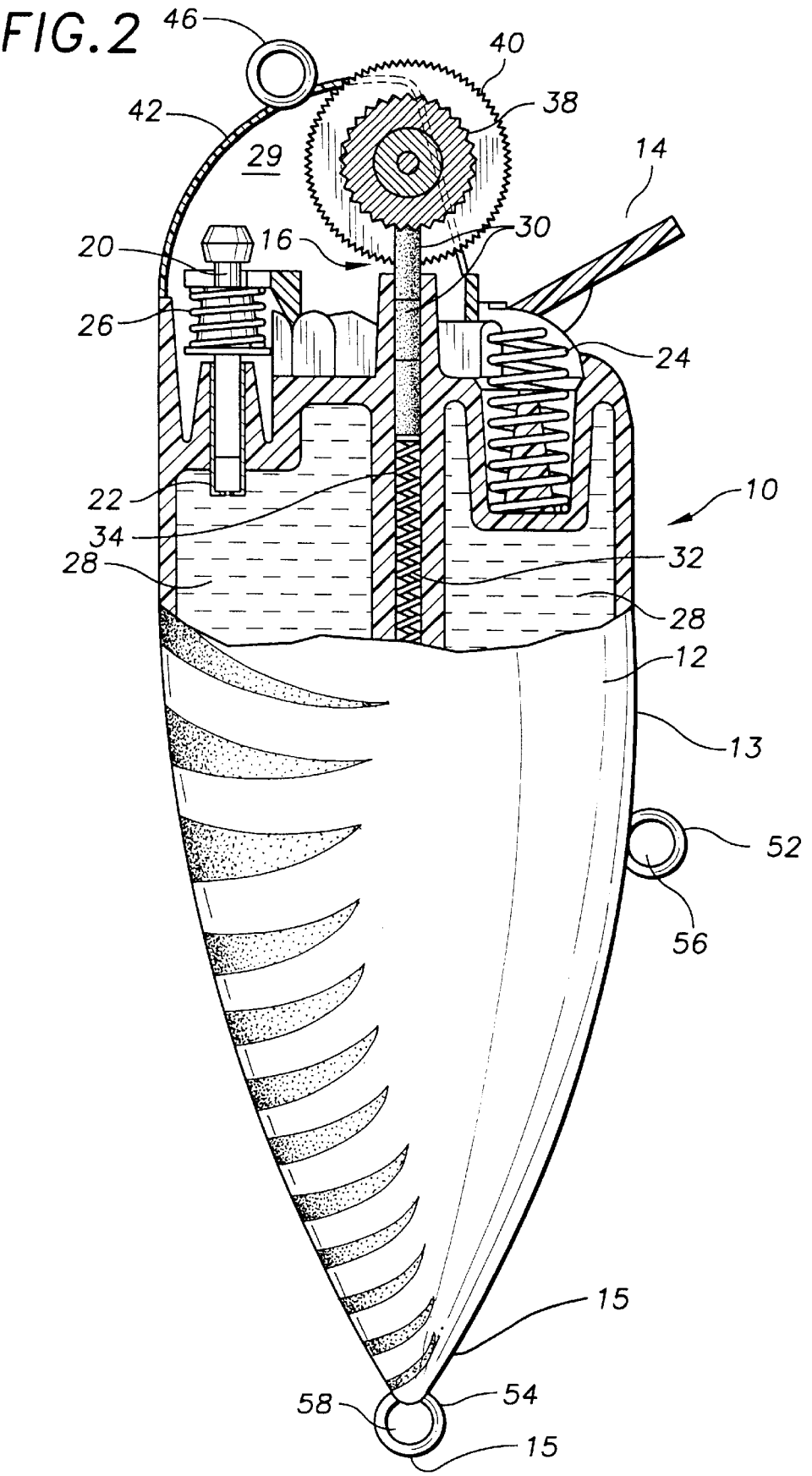
FIG. 2 shows a partial front elevational, partial sectional view taken through line 2—2 of FIG. 1, of a lighter lure as in the invention.

As illustrated in FIGS. 1–2, lighter/lure 10 includes body 12, valve actuator 14, and igniter assembly 16. Valve actuator 14 is pivotally mounted on sidewall portions 18 and attached to fuel nozzle 20. Nozzle 20 is slidably mounted in valve housing 22. Spring 24 and spring 26 are provided to respectively urge actuator 14 up and nozzle 20 down, whereby a valve assembly (not fully illustrated) in cooperation with nozzle 20 prevents the flow of fuel through nozzle 20 until raised. Depression of valve actuator 14 then raises nozzle 20, allowing the fuel stored in reservoir 28 to flow through nozzle 20. Nozzle 20 when raised is therefore the outlet for the flow of fuel into space 29 exterior to body 12.

Igniter assembly 16 comprises sparking flint 30 mounted within bore 32 and under which is mounted spring 34 for urging flint 30 into contact with toothed surface 38 of wheel assembly 40. An individual upon depressing actuator 14 to create the flow of fuel into space 29 also rotates wheel assembly 40 causing surface 38 to rub or cut against flint 30, generating a spark that ignites the fuel to produce a flame in space 29.

Lighter/lure 10 optionally may be provided with wind guard 42 having hole 43 as exit for the flame and upwardly extending sidewalls 44 that serve as a wind guard to partially enclose space 29 along the sides and thereby facilitate ignition of the fuel. Sidewalls 44 overlie sidewall portions 18, and whereas portions 18 can be plastic, wind guard 42 is preferably metal due to contact with or proximity to the flame generated through hole 43. One of sidewalls 44 is shown in FIG. 1 partially cut away at "A" to expose some of the underlying structure.

Wind guard 42 further includes ring 46 as means mounted on body 12 to connect fishing line 50 when converting lighter/lure 10 to a fishing lure. Ring 46 may optionally be positioned elsewhere on body 12 as may be desired, and the choice of location in turn may depend on various design factors. These considerations might include the choice of lighter type, for example whether it is flint or piezoelectric, since the latter does not necessitate a wheel assembly. Other factors might include the desired placement and configuration of various components, such as the wheel assembly. Ring 46 may serve a further use such as a key ring or key-chain point of attachment.

Means provided on body 12 for attaching a fishhook are rings 52 and 54 having openings 56 and 58, respectively, to which fish hook 60 may be attached. Alternatively, lighter/lure may have just one ring, or more than two, depending on the intended use and overall design. It is contemplated that lighter/lure 10 is provided without fish hook 60 attached since the initial use is as a lighter, and one or more hooks may be provided to the user for later attachment. Means for attaching a fish hook may also include screw-in type connectors, for example complementary male/female connectors provided on body 12 and hook 60 or vice-versa (not illustrated), quick connects such as slidably engagable/detachable latches (not illustrated), or other such commonly used fastening means capable of adequately securing hook 60 to body 12 for a desired fishing use. Another means for attaching a fish hook is a circular ring such as that used for attaching a key onto a key chain although it may be smaller depending on the intended application. Lighter/lure 10 may itself be attached in this manner or directly at rings 46, 52 or 54 to a key chain if desired.

Body 12 may be constructed of any suitable material and is preferably plastic. The choice of material and also the choice of shape and size of body 12 must be such as to accommodate both the intended lighter use and on the fishing lure use and permit both lighter and lure features to be integrated into the overall design. Disposable lighters, for example those sold under the BIC® brand name, are well known and can assume different sizes and shapes and incorporate different design features, such as child-resistant actuators and design shrink-on type wraps or covers of different colors or patterns, to name but a few. Body 12 can be anywhere from about 2 inches to 2 feet in length, depending on the intended use as both lighter and lure. Some salt-water lures are relatively large, as are some lighters such as tabletop lighters, and a combination of the two in a larger size could then suit both applications. A disposable such lighter/lure 10 preferably has a length in the range of from about 2 to about 3 inches in length, with a reservoir 28 having a capacity to hold a sufficient volume of fuel for the design lighter use lifespan.

Lighter/lure 10 includes one or more features that as with conventional fishing lures might attract a fish or in some manner cause a fish to react at the presence and/or movement of the lure by striking at the lure, that is, attempting to take the lure or some portion thereof into its mouth, preferably at a location where hooks are attached. One such feature is the shape of body 12, which for example can be short and fat or long and thin and designed to resemble a bait fish, such as a chub, mooneye or sucker minnow, or another common bait such as a crayfish or a frog, to name but a few. Lighter/lure 10 can in fact be whatever shape to which a fish may be attracted. Body 12 may have markings, patterns, surface features, and/or colorings or the like such as those found in conventional fishing lures and that are also useful features for attracting a fish.

Figure 3:
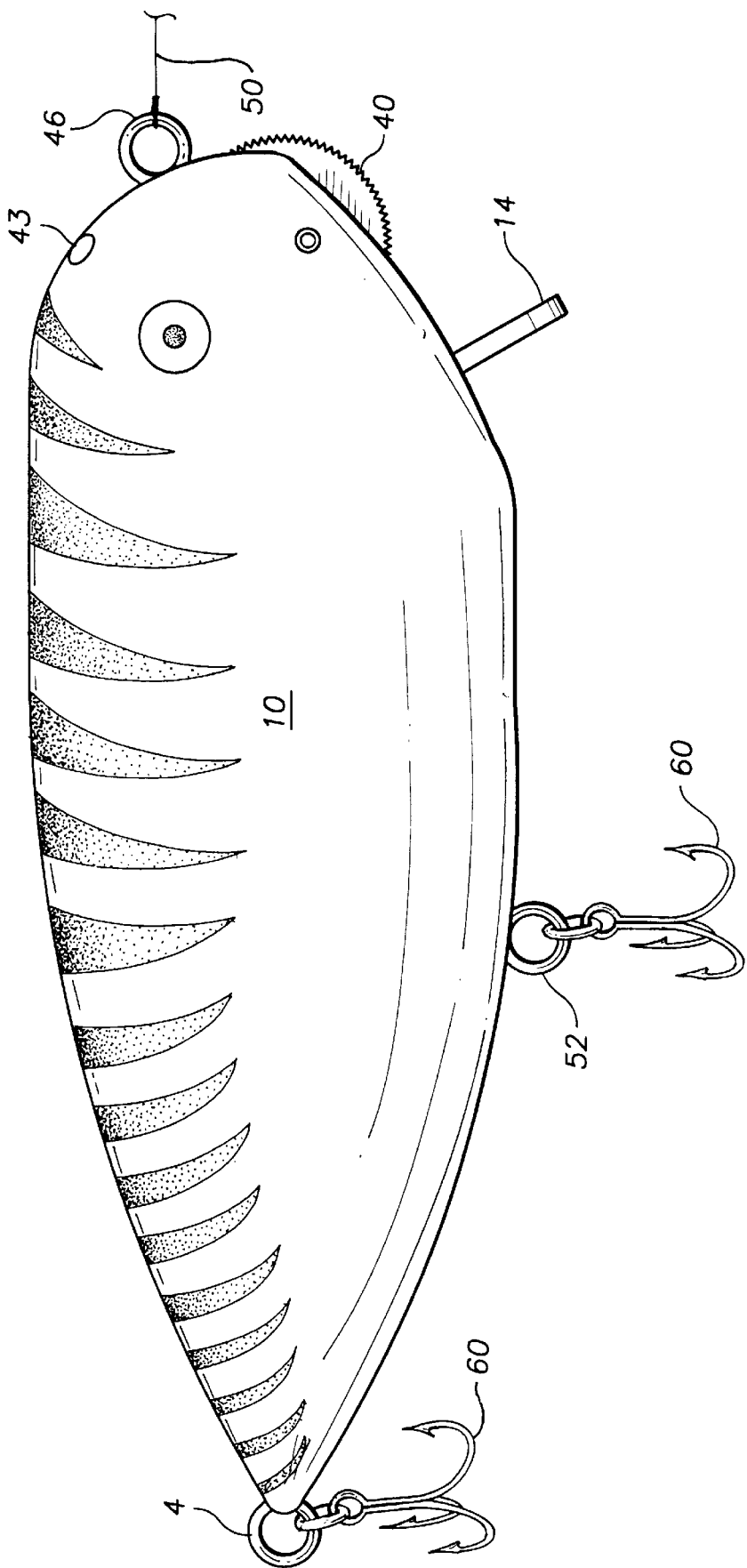
FIG. 3 shows a perspective view of a lighter/lure converted to a fishing lure as in the invention.

Another such feature is the positioning and design of actuator 14. Actuator 14 may serve a dual function, as not just the valve actuator as described above but also as what on fishing lures is termed a "spoon" or "blade". As shown in the figures, actuator 14 projects below body 12 so that when lighter/lure 10 is dragged through the water, actuator 14 provides a resistance that produces a wiggling movement as would a spoon or a blade on a conventional stick bait fishing lure. Actuator 14 and body 12 may alternatively be configured such that actuator 14 protrudes either more or less than is depicted in the figures, or actuator 14 may even by flush or somewhat recessed with respect to body 12, depending on the desired operating characteristics as a lighter and/or lure. FIG. 3 shows actuator 14 projecting at a forward angle with respect to body 12, and the angle can be varied depending on the movement and wiggling action desired when pulled through the water. Actuator 14 may further include a concave surface portion (not illustrated) as in conventional fishing lures like Rappala lures, which may increase the movement or action of the lure when pulled through the water.

Lighter/lure 10 may vary in overall size, weight, and balance or distribution of weight, the selection of which may depend on the preference of an individual user or on a desired manner of use, either in regard to use as a lighter, a fishing lure, or both. For example, a person may prefer a lighter that is relatively larger or smaller than average, one that is relatively lighter or heavier than average, or may select a lighter/lure 10 having a specific size and weight deemed appropriate for a desired fishing application. It may be desirable to counterweight body 12 where appropriate, such as along base 13 or at end 15, in order that lighter/lure 10 assume a desirable orientation when used as a lure, such as maintaining base 13 down and windguard 42 up with respect to the fisherman and the body of water.

An individual can easily convert lighter/lure 10 to a fishing lure simply by attaching one or more hooks 60 to ring 52 and/or ring 54, and tying a fishing line to ring 46.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. A lighter convertible to a fishing lure, comprising:
    a) a body having a feature useful for attracting a fish;
    b) a reservoir for holding a fuel;
    c) an igniter to ignite said fuel and produce a flame;
    d) an outlet at which said flame is produced;
    e) means for attaching said body to a fishing line; and
    f) means for attaching a fish hook onto said body.

2. A lighter as in claim 1, wherein said lighter is the disposable type.

3. A lighter as in claim 1, wherein said lighter further includes a fish hook.

4. A lighter as in claim 3, wherein said igniter includes a valve actuator that protrudes at a forward angle with respect to said body.

5. A lighter as in claim 4, wherein said lighter is the disposable type.

6. A fishing lure also useful as a lighter and convertible from said lighter into said fishing lure, comprising:
    a) a body having a feature useful for attracting a fish;
    b) a reservoir for holding a fuel;
    c) an igniter to ignite said fuel and produce a flame;
    d) an outlet at which said flame is produced;
    e) means for attaching said body to a fishing line; and
    (f) means for attaching a fish hook onto said body.

7. A fishing lure as in claim 6, wherein said lure further includes a fishhook.

8. A fishing lure as in claim 7, wherein said igniter includes a valve actuator that protrudes at a forward angle with respect to said body.

9. A method of converting a lighter to a fishing lure, comprising the steps of:
    a) providing a lighter, said lighter comprising:
        (i) a body having a feature useful for attracting a fish;
        (ii) a reservoir for holding a fuel;
        (iii) an igniter to ignite said fuel and produce a flame;
        (iv) an outlet at which said flame is produced;
        (v) means for attaching the body to a fishing line; and
        (vi) means for attaching a fish hook onto the body; and
    b) attaching said lighter by said means for attaching the body to a fishing line, thereby converting said lighter into said fishing lure whereby the user is able to use said fishing lure to attract the fish.

10. A method as in claim 9, wherein said lighter is the disposable type.

11. A method as in claim 9, wherein said lighter further comprises a valve actuator that protrudes at a forward angle with respect to said body.

12. A method as in claim 11, further comprising the step of attaching the fishhook onto said body of said fishing lure at said means for attaching a fishhook onto said body.

13. A method as in claim 12, wherein said lighter is the disposable type.

* * * * *